US005899008A

United States Patent [19]

Cobo et al.

[11] Patent Number: 5,899,008

[45] Date of Patent: May 4, 1999

[54] METHOD AND APPARATUS FOR CONTROLLING AN IMPLEMENT OF A WORK MACHINE

[75] Inventors: Michael A. Cobo, St. Charles; Cynthia M. Gardner, North Aurora; James E. Schimpf, Plainfield, all of Ill.

[73] Assignee: Caterpillar Inc., Peoria, Ill.

[21] Appl. No.: 08/861,554

[22] Filed: May 22, 1997

[51] Int. Cl.[6] .......................... F16K 31/124; F15B 13/16

[52] U.S. Cl. .......................... 37/348; 91/361

[58] Field of Search .......................... 37/348; 172/2, 172/1, 3, 4, 4.5, 7, 9, 11; 91/361, 363 R, 363 A, 459, 387; 60/459, 420, 426, 427, 327; 318/575, 543–551; 180/167, 168

[56] References Cited

U.S. PATENT DOCUMENTS

| | | | |
|---|---|---|---|
| 4,625,622 | 12/1986 | Gunda et al. | 91/36 |
| 4,844,685 | 7/1989 | Sagaser | 414/700 |
| 5,189,940 | 3/1993 | Hosseini et al. | 91/361 |
| 5,333,533 | 8/1994 | Hosseini | 91/361 |
| 5,366,202 | 11/1994 | Lunzman | 91/387 X |
| 5,511,458 | 4/1996 | Kamata et al. | 91/361 |
| 5,537,818 | 7/1996 | Hosseini et al. | 60/327 |
| 5,666,806 | 9/1997 | Dietz | 91/361 X |
| 5,737,993 | 4/1998 | Cobo et al. | 91/361 |
| 5,757,158 | 5/1998 | Ferguson et al. | 318/575 |

*Primary Examiner*—Thomas B. Will
*Assistant Examiner*—Robert Pezzuto
*Attorney, Agent, or Firm*—David M. Masterson

[57] ABSTRACT

An apparatus for controllably moving a work implement. The implement is connected to a work machine and is moveable in response to the operation of a hydraulic cylinder. The apparatus includes an operator controlled joystick that generates an operator command signal, which is indicative of a desired velocity of the work implement movement. Cylinder position sensors produce cylinder position signals in response to the position of lift and tilt cylinders. A valve assembly receives an electrical valve signal, and controllably provides hydraulic fluid flow to the respective hydraulic cylinders to move the cylinders in accordance with the operator command signal. A controller receives the operator command and cylinder position signals, and responsively produces a pump command signal to change the displacement of a variable displacement pump to regulate the movement of the hydraulic cylinders.

8 Claims, 4 Drawing Sheets

METHOD AND APPARATUS FOR CONTROLLING AN IMPLEMENT OF A WORK MACHINE

DESCRIPTION

1. Technical Field

This invention relates generally to a method and apparatus for controlling the movement of a work implement of a work machine and, more particularly, to an apparatus and method that controls the movement of the work implement in response to controlling a variable displacement pump.

2. Background Art

Work machines such as wheel type loaders include work implements capable of being moved through a number of positions during a work cycle. Such implements typically include buckets, forks, and other material handling apparatus. The typical work cycle associated with a bucket includes sequentially positioning the bucket and associated lift arm in a digging position for filling the bucket with material, a carrying position, a raised position, and a dumping position for removing material from the bucket.

Control levers are mounted at the operator's station and are connected to an electrohydraulic circuit for moving the bucket and/or lift arms. The operator must manually move the control levers to open and close hydraulic valves that direct pressurized fluid to hydraulic cylinders which in turn cause the implement to move. For example, when the lift arms are to be raised, the operator moves the control lever associated with the lift arm hydraulic circuit to a position at which a hydraulic valve causes pressurized fluid to flow to the head end of a lift cylinder, thus causing the lift arms to rise. When the control lever returns to a neutral position, the hydraulic valve closes and pressurized fluid no longer flows to the lift cylinder.

In normal operation, the implement is often abruptly started or brought to an abrupt stop after performing a desired work cycle function, which results in rapid changes in velocity and acceleration of the bucket and/or lift arm, machine, and operator. This can occur, for example, when the implement is moved to the end of its desired range of motion. The geometric relationship between the linear movement of the tilt or lift cylinders and the corresponding angular movement of the bucket or lift arm can produce operator discomfort as a result of the rapid changes in velocity and acceleration. The forces absorbed by the linkage assembly and the associated hydraulic circuitry may result in increased maintenance and accelerated failure of the associated parts. Another potential result of the geometric relationship is excessive angular rotation of the lift arm or bucket near some linear cylinder positions which may result in poor performance.

Stresses are also produced when the machine is lowering a load and operator quickly closes the associated hydraulic valve. The inertia of the load and implement exerts forces on the lift arm assembly and hydraulic system when the associated hydraulic valve is quickly closed and the motion of the lift arms is abruptly stopped. Such stops cause increased wear on the machines and reduce operator comfort. In some situations, the rear of the machine can even be raised off of the ground.

Finally, autonomous control of earthmoving machines often require closed loop position or velocity control of corresponding subsystems to provide disturbance rejection and high levels of accuracy while under control of a high level controller. The work implement is one example of such a subsystem.

The present invention is directed to overcoming one or more of the problems as set forth above.

DISCLOSURE OF THE INVENTION

In one aspect of the present invention, an apparatus for controllably moving a work implement is disclosed. The implement is connected to a work machine and is moveable in response to the operation of a hydraulic cylinder. The apparatus includes an operator controlled joystick that generates an operator command signal, which is indicative of a desired velocity of the work implement movement. Cylinder position sensors produce cylinder position signals in response to the position of lift and tilt cylinders. A valve assembly receives an electrical valve signal, and controllably provides hydraulic fluid flow to the respective hydraulic cylinders to move the cylinders in accordance with the operator command signal. A controller receives the operator command and cylinder position signals, and responsively produces a pump command signal to change the displacement of a variable displacement pump to regulate the movement of the hydraulic cylinders.

BRIEF DESCRIPTION OF THE DRAWINGS

For a better understanding of the present invention, reference may be made to the accompanying drawings in which.

BEST MODE FOR CARRYING OUT THE INVENTION

Figure 1:
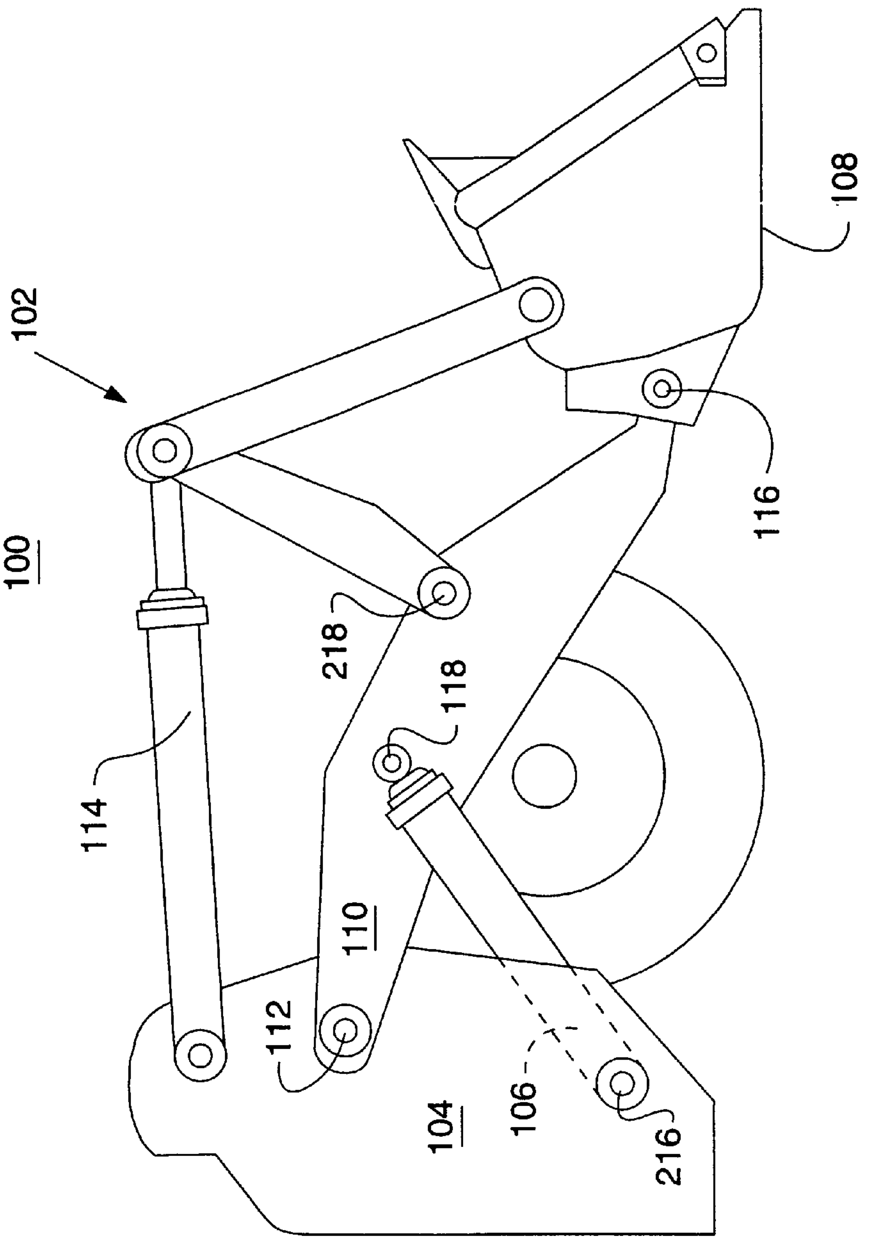
FIG. 1 is a side view of a forward portion of a loader machine or wheel type loader.

In FIG. 1, an implement control system is generally represented by the element number 100. FIG. 1 shows a forward portion of a wheel type loader machine 104 having a payload carrier in the form of a bucket 108. Although the present invention is described in relation to a wheel type loader machine, the present invention is equally applicable to many earth working machines such as track type loaders, hydraulic excavators, and other machines having similar loading implements. The bucket 108 is connected to a lift arm assembly or boom 110, which is pivotally actuated by two hydraulic lift actuators or cylinders 106 (only one of which is shown) about a boom pivot pin 112 that is attached to the is machine frame. A boom load bearing pivot pin 118 is attached to the boom 110 and the lift cylinders 106. The bucket 108 is tilted by a bucket tilt actuator or cylinder 114 about a tilt pivot pin 116.

Figure 2:
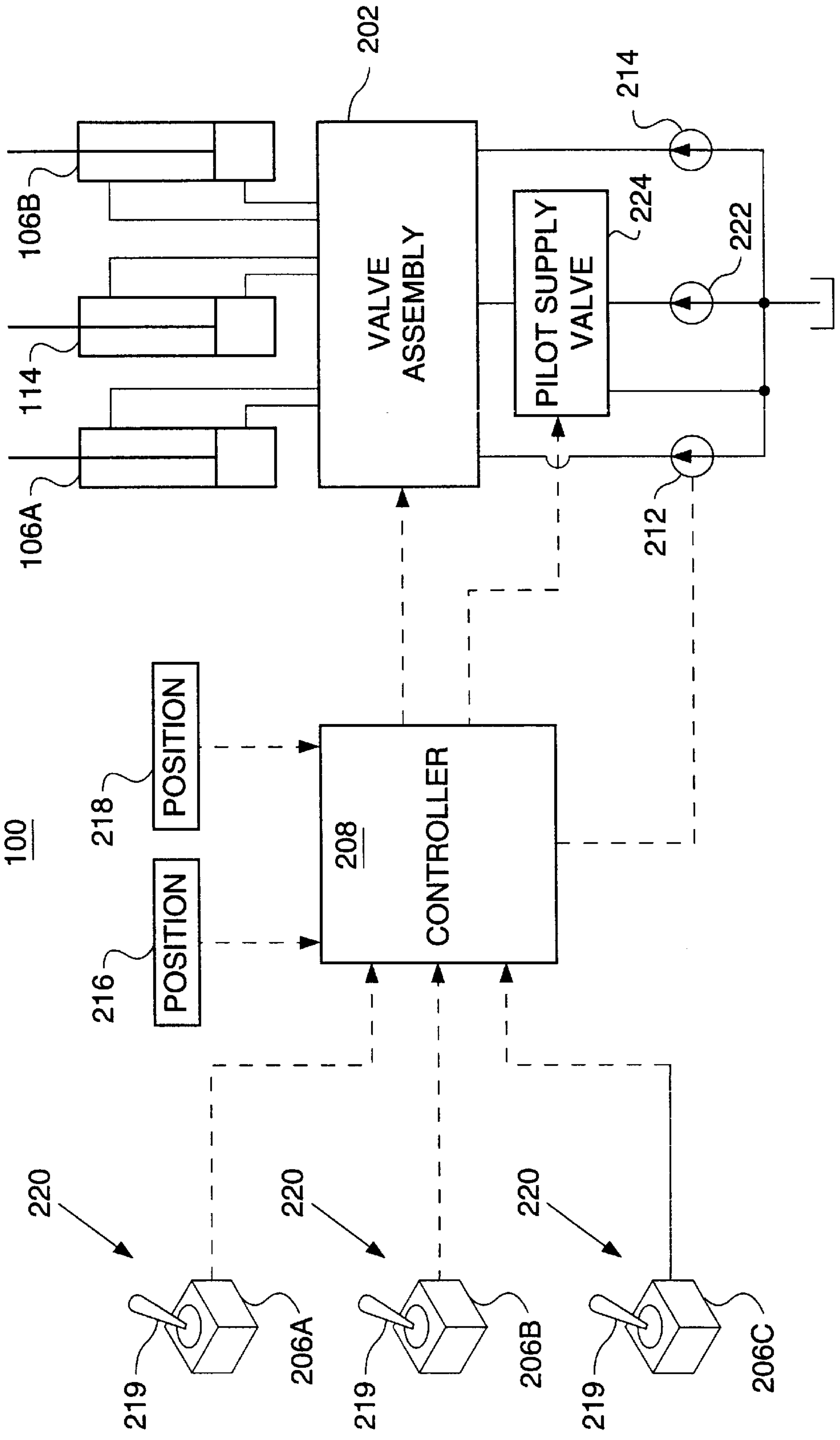
FIG. 2 is a block diagram of an electrohydraulic control system of the loader machine.

With reference to FIG. 2, the implement control system 100 as applied to a wheel type loader is diagrammatically illustrated. The implement control system is adapted to sense a plurality of inputs and responsively produce output signals which are delivered to various actuators in the control system. Preferably, the implement control system includes a microprocessor based controller 208.

First, second, and third joysticks 206A, 206B, 206C provide operator control over the work implement 102. The joysticks include a control lever 219 that has movement along a single axis. However, in addition to movement along a first axis (horizontal), the control lever 219 may also move along a second axis which is perpendicular to the horizontal axis. The first joystick 206A controls the lifting operation of the boom 110. The second joystick 206B controls the tilting operation of the bucket 108. The third joystick 206C controls an auxiliary function, such as operation of a special work tool.

A joystick position sensor 220 senses the position of the joystick control lever 219 and responsively generates an electrical operator command signal. The operator command signal is indicative of the desired velocity of the respective hydraulic cylinder. The electrical signal is delivered to an input of the controller 208. The joystick position sensors 220 preferably includes a rotary potentiometer which produces a pulse width modulated signal in response to the pivotal position of the control lever; however, any sensor that is capable of producing an electrical signal in response to the pivotal position of the control lever would be operable with the instant invention.

A cylinder position sensors 216, 218 senses the position of the lift and tilt cylinders 106, 114 and responsively produces respective cylinder position signals. In one embodiment, the position sensors 216, 218 include rotary potentiometers. The rotary potentiometers produce pulse width modulated signals in response to the angular position of the boom 110 with respect to the machine and the bucket 108 with respect to the boom 110. The angular position of the boom is a function of the lift cylinder extension 106A, B, while the angular position of the bucket 108 is a function of both the tilt and lift cylinder extensions 114, 106A, B. Note, the function of the position sensors 216, 218 can readily be accomplished by any other sensor which is capable of measuring, either directly or indirectly, the relative extension of a hydraulic cylinder. For example, the potentiometers could be replaced with radio frequency (RF) sensors disposed within the hydraulic cylinders.

A valve assembly 202 is responsive to electrical signals produced by the controller 208 and provides hydraulic fluid flow to the hydraulic cylinders 106A, B, 114. In the preferred embodiment, the valve assembly 202 includes four main valves (two main valves for the lift cylinders and two main valves for the tilt cylinder) and eight hydraulic valves (two hydraulic valves for each main valve). The main valves direct pressured fluid to the cylinders 106A, B, 114 and the hydraulic valves direct pilot fluid flow to the main valves. Each hydraulic valve is electrically connected to the controller 208. An exemplary hydraulic valve is disclosed in U.S. Pat. No. 5,366,202 issued on Nov. 22, 1994 to Stephen V. Lunzman, which is hereby incorporated by reference. Two main pumps 212, 214 are used to supply hydraulic fluid to the main spools, while a pilot pump 222 is used to supply hydraulic fluid to the hydraulic valves. An on/off solenoid valve and pressure relief valve 224 are included to control pilot fluid flow to the hydraulic valves.

The present invention is directed toward determining a pump command signal magnitude to accurately control the work implement movement. The controller 208 preferably includes RAM and ROM modules that store software programs to carry out certain features of the present invention. Further, the RAM and ROM modules store software in at least one look-up table or map that is used in determining the pump command signal magnitude. The map corresponds to a work function that is used to control the work implement. The work function may include a lift and lower operation which extends and retracts the lift hydraulic cylinders 106A, B to control the bucket height, and a dump and rack operation which extends and retracts the tilt cylinder 114 to control the bucket attitude. The number of values stored in the map is dependent upon the desired precision of the system. Interpolation may be used to determine the actual value in the event that the measured and calculated values fall between the discrete values stored in memory. The map values are based from simulation and analysis of empirical data.

In operation, the controller 208 receives the operator command signals and responsively produces electrical valve signal and a pump command signal to control the respective hydraulic cylinders at a desired velocity. The valve assembly 202 receives the electrical valve signal and either or both pumps 212, 214 receive the pump command signal to controllably provides hydraulic fluid flow to the respective hydraulic cylinder in response to the magnitude of the electrical valve and pump command signals.

Figure 3:
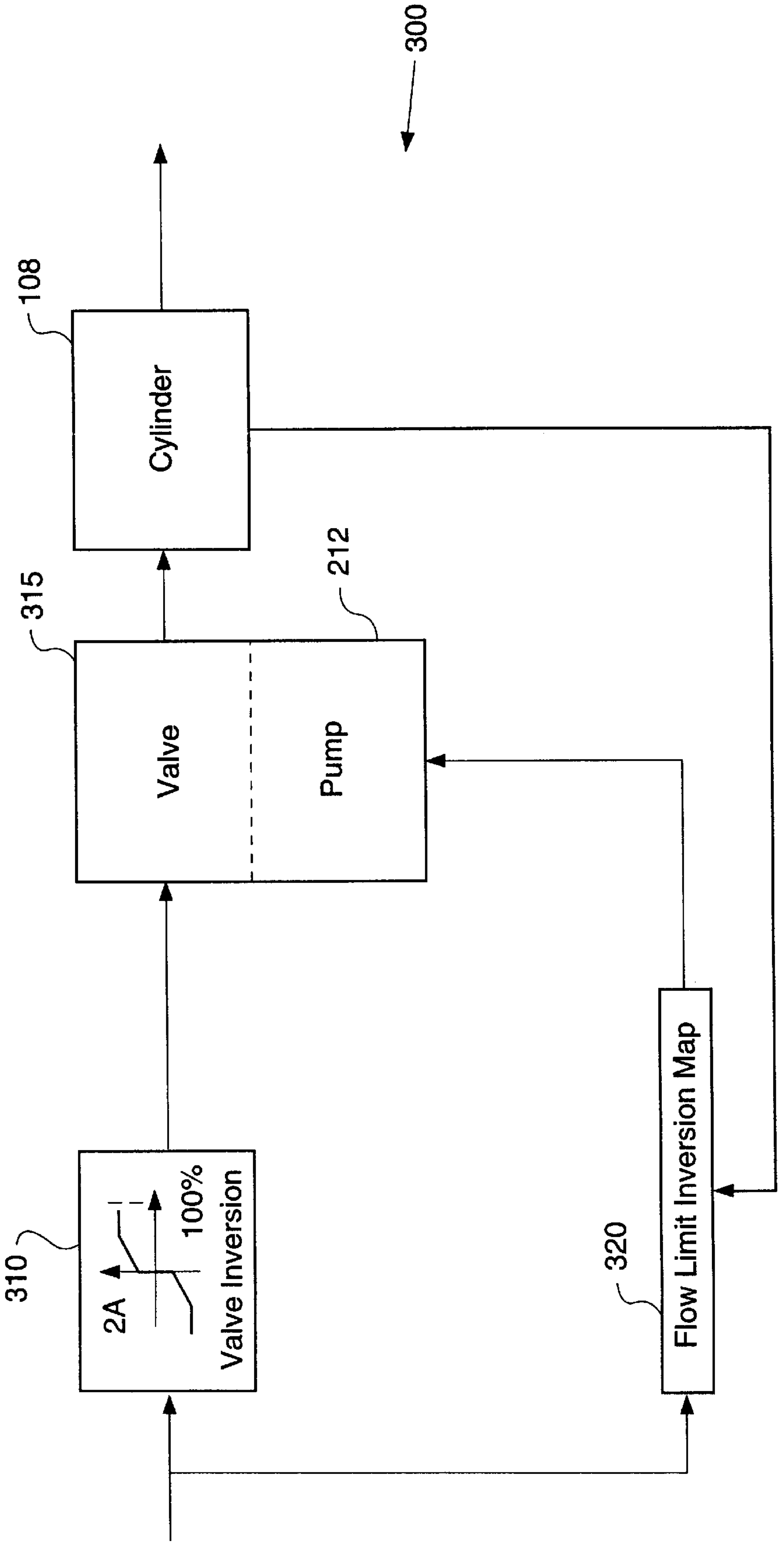
FIG. 3 is block diagram of an embodiment of a control system of the electrohydraulic control.

Reference is now made to FIG. 3, which shows a preferred embodiment of the control structure of the controller 208. As shown, the control structure consists of a control system 300 that is based on positional feedback. In the preferred embodiment, the control system 300 is responsible for regulating the lifting function associated with the lift cylinders 106. However, the control system 300 may be represented by similar embodiments that control the lowering function associated with the lift cylinders 106, as well as, the racking and dumping functions associated with the tilt cylinder 114. The operation of the control system 300 is described as follows.

First, a valve transformation block 310 transforms the operator command signal into an electrical valve signal, which is indicative of a desired stem displacement of the corresponding hydraulic type valve 315. The electrical valve signal is then delivered to the valve 315 to control the fluid flow to the lift cylinders 106A, B in order to raise the bucket 108 at the desired velocity.

A flow limit map 320 additionally receives the operator command signal and the lift cylinder position signal, which is indicative of the bucket height, and responsively produces a pump command signal. The pump command signal represents a desired pump displacement that is used to regulate the maximum velocity of the lifting operation. By controlling the pump and valve spool displacements, the fluid flow delivered to the lift cylinders 106 is controlled, which regulates the speed of the lifting operation. The flow limit map 320 is better shown in relation to FIG. 4.

Figure 4:
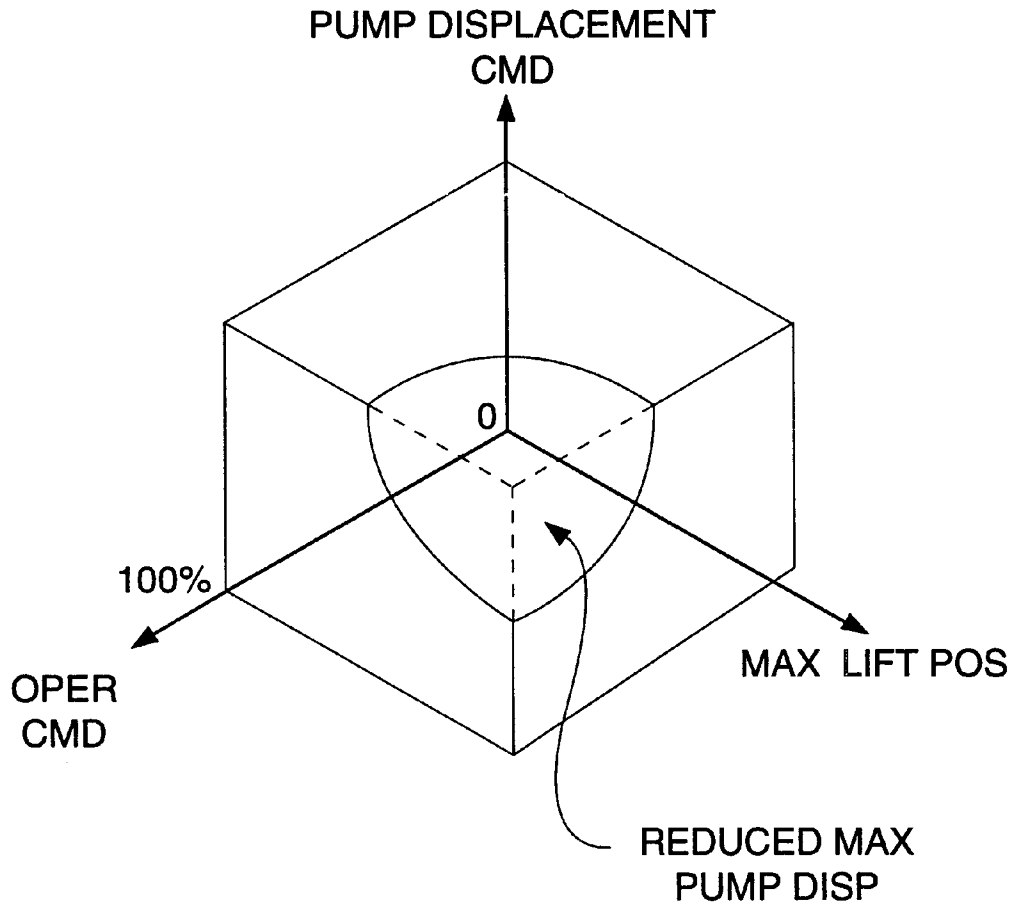
FIG. 4 is a three dimensional graphical representation of a flow limit map.

The flow limit map 320, as shown in FIG. 4, stores a plurality of pump command signal magnitudes that correspond to a plurality of operator command and lift cylinder position signal magnitudes. Thus, based on the operator command and the lift cylinder position, the controller 208 determines a desired pump command signal magnitude to slow or limit the lifting of the bucket as the lift cylinders 106A, B move toward the end of stroke. Advantageously, the controller 208 produces the pump command signal having a magnitude that is used to slow the velocity associated with the lifting operation as the bucket 108 approaches the maximum lifting position.

Note that, another map, similar to that shown in FIG. 4, could be used in controlling the lowering operation. Moreover, other similar maps could be used to control the dumping and racking operations. Further, although a map is shown and described, it will be apparent to those skilled in the art that the map may be represented by an empirical equation. Thus, rather than selecting the pump command signal magnitude from a map in response to the operator command and lift cylinder position, the controller 208 can compute the pump command signal magnitude based on the empirical equation in response to the operator command and lift cylinder position.

Thus, while the present invention has been particularly shown and described with reference to the preferred embodiment above, it will be understood by those skilled in the art that various additional embodiments may be contemplated without departing from the spirit and scope of the present invention.

INDUSTRIAL APPLICABILITY

Earth working machines such as wheel type loaders include work implements capable of being moved through a number of positions during a work cycle. The typical work cycle associated with a bucket includes positioning the boom and bucket in a digging position for filling the bucket with material, a carrying position, a raised position, and a dumping position for removing material from the bucket.

The present invention provides a method and apparatus that utilizes a control system that slows the work implement velocity as the cylinders reach the end of stroke. More particularly, the present invention slows the lifting operation as the lift cylinder reaches the end of stroke in response to the operator command and lift cylinder position.

At should be understood that while the function of the preferred embodiment is described in connection with the boom and associated hydraulic circuits, the present invention is readily adaptable to control the position of implements for other types of earth working machines. For example, the present invention could be employed to control implements on hydraulic excavators, backhoes, and similar machines having hydraulically operated implements.

Other aspects, objects and advantages of the present invention can be obtained from a study of the drawings, the disclosure and the appended claims.

We claim:

1. An apparatus for controllably moving a work implement of an earth moving machine having an internal combustion engine, the work implement including a boom and a bucket being attached thereto, the work implement including a plurality of work functions that includes a lifting and lowering operation where the boom is actuated by a hydraulic lift cylinder and a racking and dumping operation where the bucket is actuated by a hydraulic tilt cylinder, comprising:

- an operator controlled joystick;
- joystick position sensors for sensing the position of the joystick and responsively generating an operator command signal;
- cylinder position sensors for sensing the position of the lift and tilt cylinders, and responsively producing respective cylinder position signals;
- means for receiving the operator command signal and responsively producing an electrical valve signal;
- a valve assembly for receiving the electrical valve signal, and controllably providing hydraulic fluid flow to the respective hydraulic cylinders to move the hydraulic cylinders in accordance with the operator command signal;
- a variable displacement pump that provides pressurized fluid to the valve assembly; and
- means for receiving the operator command and cylinder position signals, and responsively delivering a pump command signal to change the displacement of the variable displacement pump to regulate the movement of the respective hydraulic cylinders.

2. An apparatus, as set forth in claim 1, including a software map that stores a plurality of pump command signal magnitudes that correspond to a plurality of operator command and cylinder position signal magnitudes.

3. An apparatus, as set forth in claim 2, including means for selecting one of the plurality of pump command signal magnitudes from the map in response to the operator command and cylinder position signal magnitudes.

4. An apparatus, as set forth in claim 3, wherein the pump command signal magnitude is selected to decrease the pump displacement to slow the lift cylinder velocity as the lift cylinder reaches the end of stroke during a lifting operation.

5. A method for controllably moving a work implement of an earth moving machine having an internal combustion engine, the work implement including a lift and tilt hydraulic cylinder and a variable displacement pump that provides pressurized fluid to the hydraulic cylinders, the method comprising the steps of:

- generating an operator command signal;
- sensing the position of the lift and tilt cylinders and responsively producing respective cylinder position signals;
- receiving the operator command signal and responsively producing an electrical valve signal;
- receiving the electrical valve signal, and controllably providing hydraulic fluid flow to the respective hydraulic cylinders to move the hydraulic cylinders in accordance with the operator command signal; and
- receiving the operator command and cylinder position signals, and responsively producing a pump command signal to change the displacement of the variable displacement pump to regulate the movement of the respective hydraulic cylinders.

6. A method, as set forth in claim 5, including the step of storing a plurality of pump command signal magnitudes that correspond to a plurality of operator command and cylinder position signal magnitudes.

7. An method, as set forth in claim 6, including the step of selecting one of the plurality of pump command signal magnitudes from the stored magnitudes in response to the operator command and cylinder position signal magnitudes.

8. An method, as set forth in claim 7, including the step of selecting the stored pump command signal magnitude to decrease the pump displacement to slow the hydraulic cylinder velocities.

* * * * *